(12) United States Patent
Peng

(10) Patent No.: US 9,694,346 B2
(45) Date of Patent: Jul. 4, 2017

(54) FUNCTIONAL GAS-ASSISTED IMPREGNATION METHOD FOR PRODUCING NOBLE METAL ALLOY CATALYSTS WITH DEFINED MORPHOLOGY

(71) Applicant: Zhenmeng Peng, Hudson, OH (US)

(72) Inventor: Zhenmeng Peng, Hudson, OH (US)

(73) Assignee: The University of Akron, Akron, OH (US)

( * ) Notice: Subject to any disclaimer, the term of this patent is extended or adjusted under 35 U.S.C. 154(b) by 0 days.

(21) Appl. No.: 14/903,691

(22) PCT Filed: Jul. 10, 2014

(86) PCT No.: PCT/US2014/046079
§ 371 (c)(1),
(2) Date: Jan. 8, 2016

(87) PCT Pub. No.: WO2015/006527
PCT Pub. Date: Jan. 15, 2015

(65) Prior Publication Data
US 2016/0158730 A1    Jun. 9, 2016

Related U.S. Application Data

(60) Provisional application No. 61/844,489, filed on Jul. 10, 2013.

(51) Int. Cl.
C22C 5/00    (2006.01)
B01J 23/42   (2006.01)
(Continued)

(52) U.S. Cl.
CPC ............ B01J 23/42 (2013.01); B01J 23/38 (2013.01); B01J 35/0013 (2013.01);
(Continued)

(58) Field of Classification Search
CPC ... B01J 21/04; B01J 21/06; B01J 23/38; B01J 23/40; B01J 23/42; B01J 23/48; B01J 23/56; B01J 23/64; B01J 27/22; B01J 27/224; B01J 35/023; B01J 35/026; B01J 37/0201; B01J 37/0203; B01J 37/0207; B01J 37/04; B01J 37/08; B01J 37/16; B01J 37/18
(Continued)

(56) References Cited

U.S. PATENT DOCUMENTS 2,488,560 A * 11/1949 Reiltlinger ............ B01J 23/745
                                                  502/300
4,774,221 A *  9/1988 Medem ................... B01J 23/44
                                                  502/177
(Continued)

Primary Examiner — Patricia L Hailey
(74) Attorney, Agent, or Firm — Renner Kenner Greive Bobak Taylor & Weber

(57) ABSTRACT

A method for making catalysts of noble metal nanoparticles or alloy nanoparticles or both having shaped morphology, the method including the steps of: pretreating a support material; impregnating metal precursors onto the support material; and then reducing the impregnated metal precursors into shaped metal nanoparticles or shaped alloy nanoparticles or both using a functional gas atmosphere.

18 Claims, 5 Drawing Sheets

(51) Int. Cl.
  *B01J 37/16* (2006.01)
  *B01J 23/38* (2006.01)
  *B01J 35/00* (2006.01)
  *B01J 35/02* (2006.01)
  *B01J 37/02* (2006.01)
  *B01J 37/18* (2006.01)
  *H01M 4/92* (2006.01)

(52) U.S. Cl.
  CPC ........... *B01J 35/023* (2013.01); *B01J 35/026* (2013.01); *B01J 37/0203* (2013.01); *B01J 37/0207* (2013.01); *B01J 37/16* (2013.01); *B01J 37/18* (2013.01); *H01M 4/92* (2013.01)

(58) Field of Classification Search
  USPC ............... 502/326, 330, 337–339, 312, 313, 502/315–318; 420/461–463, 466–469, 420/501–503, 505, 507–512
  See application file for complete search history.

(56) References Cited

U.S. PATENT DOCUMENTS

| | | |
|---|---|---|
| 6,746,597 B2 | 6/2004 | Zhou |
| 7,632,773 B2 | 12/2009 | Zhou |
| 2004/0132832 A1* | 7/2004 | Espinoza ................. B01J 21/04 518/716 |
| 2008/0166288 A1* | 7/2008 | Zhou ........................ B01J 23/44 423/586 |
| 2013/0133483 A1 | 5/2013 | Yang |

\* cited by examiner

FUNCTIONAL GAS-ASSISTED IMPREGNATION METHOD FOR PRODUCING NOBLE METAL ALLOY CATALYSTS WITH DEFINED MORPHOLOGY

CROSS-REFERENCE TO RELATED APPLICATIONS

This application claims the benefit of U.S. provisional patent application Ser. No. 61/844,489 entitled "Functional Gas-Assisted Impregnation Method for Producing Noble Metal Alloy Catalysts with Defined Morphology," filed Jul. 10, 2013, and incorporated by reference in its entirety.

FIELD OF THE INVENTION

The present invention generally relates to noble metal and alloy catalysts, and methods for making them. In particular, the present invention relates to noble metal and alloy catalysts production using a functional gas-assisted impregnation method. More particularly, the present invention relates to noble metal and alloy nanoparticle catalysts that have defined morphology and are free of hydrocarbons, thereby avoiding possible surface contamination, and methods for making them.

BACKGROUND OF THE INVENTION

Noble metals and their alloys have important applications as catalysts for many chemical and electrochemical reactions in both industry and research. Metal and alloy nanoparticles on a support material are one common practice for their use as a catalyst. The use of a support material is for separation and stabilization of the nanoparticles from agglomeration and sintering. The main driving force to make the noble metals and their alloys into nanoparticles is the high cost of the precious metals. Primarily, only surface atoms are involved in catalysis, therefore, the overall cost of catalysts can be largely reduced by making the particles smaller.

Noble metal and alloy nanoparticles with specific morphologies have been found to exhibit improved catalytic properties, such as activity, selectivity, and durability, in many reactions. Therefore, by manipulating the morphology of noble metal alloy nanoparticles, the catalytic properties of the catalyst can be improved, and their usage can be decreased. Many different methods have been explored for preparing noble metal alloy catalysts with specific morphologies. In the conventional impregnation method an active metal precursor is dissolved in an aqueous or organic solution and then the metal-containing solution is added to a catalyst support containing a pore volume equal to the volume of the metal-containing solution that is added. Capillary action draws the solution into the pores. Solution added in excess of the support pore volume causes the solution transport to change from a capillary action process to a diffusion process, which is much slower. The catalyst can then be dried and calcined to drive off the volatile components within the solution, depositing the metal on the catalyst surface.

The impregnation method is one of the most robust techniques in making a supported noble metal nanoparticle and has been broadly adopted for both industrial production and fundamental research in laboratories. However, there is a lack of control over the size of the metal particles, the morphology of the metal particles, and the uniformity of the metal particles when the impregnation method is used. The final product often contains a mixture of pseudo-spherical particles of different sizes, which is not ideal.

In other methods, noble metal particles are synthesized in a solution and are then placed onto a support material. The solution typically contains capping agents, which are chemical molecules which can strongly adsorb to the surface of materials, such as nanoparticles. The adsorption of capping agents to growing nanoparticles can alter their growth behavior and thus influence the morphology of the growing particles. However, these synthetic techniques have obvious limitations and can hardly be transformed into real application, especially for applications as important as making catalysts. The main limitation of all current approaches for the synthesis of shaped metal particles is that they are based on wet chemistry techniques that have complex procedures. The complexity and rigid requirements on the reaction conditions largely limit the capability for large-scale production of the shaped metal nanoparticles. In addition, the heavy usage of different organic species adds to the production costs and contaminates the surface of the nanoparticles. In order for the shaped metal nanoparticle to be used as a catalyst, further steps must be taken to clean the surface of the synthesized noble metal nanoparticle.

Thus, there is a need in the art for noble metal and alloy catalysts with controlled particle morphology and methods for making them that eliminate the contamination problem caused by the use of organic capping agents and which can simplify the overall synthetic procedure.

SUMMARY OF THE INVENTION

In a first embodiment, the present invention provides a method for making catalysts of noble metal nanoparticles or alloy nanoparticles or both having shaped morphology, the method comprising the steps of: pretreating a support material; impregnating metal precursors onto said support material; and reducing the impregnated metal precursors into shaped metal nanoparticles or shaped alloy nanoparticles or both using a functional gas atmosphere.

In a second embodiment, the present invention provides a method as in the first embodiment, wherein the support material is selected from the group consisting of carbon, silica, silicon carbide, silicon nitride, carbon nitride, aluminum oxide, titanium oxide, cerium oxide, zirconium oxide, zeolite, aluminum silicate, magnesium aluminate, and polymers.

In a third embodiment, the present invention provides a method as in the first or second embodiments, wherein the step of pretreating the support material comprises removing moisture from the support material.

In a fourth embodiment, the present invention provides a method as in the first through third embodiments, wherein the step of pretreating the support material comprises modifying the support material with surface groups.

In a fifth embodiment, the present invention provides a method as in the first through fourth embodiments, wherein the metal precursors are selected from the group consisting of inorganic salts or organic species.

In a sixth embodiment, the present invention provides a method as in the first through fifth embodiments, wherein the metal precursors are selected from the group consisting of metal chlorides, metal sulfates, metal nitrates, metal cyanides, metal phosphates, metal acetylacetonates, metal stearates, metal acetates, metal carbonyls, metal propionates, metal fluoroacetylacetonates, metal fluoroacetates and mixtures thereof.

In a seventh embodiment, the present invention provides a method as in the first through sixth embodiments, wherein the metal precursors are chosen such that the shaped metal nanoparticles or shaped alloy nanoparticles or both formed in said step of reducing are selected from platinum, palladium, rhodium, ruthenium, iridium, rhenium, tungsten, alloys of two or more of the forgoing, and alloys of one or more of the forgoing with one or more transition metals.

In an eighth embodiment, the present invention provides a method as in the first through seventh embodiments, wherein the transition metals are selected from iron, copper, nickel, cobalt, silver, gold, molybdenum, titanium, vanadium, zinc, cadmium, mercury, gallium, indium, tin, lead, and bismuth.

In a ninth embodiment, the present invention provides a method as in the first through eighth embodiments, wherein impregnating metal precursors onto said support material comprises: dissolving the metal precursors in a solvent to make a metal precursor solution; mixing said metal precursor solution with said support material to make a catalyst forming mixture; and drying said catalyst forming mixture.

In a tenth embodiment, the present invention provides a method as in the first through ninth embodiments, wherein the solvent is selected from the group consisting of water, ethanol, acetone, hexane, chloroform, toluene, methanol, propanol, dimethyl ether, tetrahydrofuran, and dimethyl sulfoxide.

In an eleventh embodiment, the present invention provides a method as in the first through tenth embodiments, wherein the metal precursor solution is mixed for a period of from 5 minutes or more to 180 minutes or less.

In a twelfth embodiment, the present invention provides a method as in the first through eleventh embodiments, wherein the catalyst forming mixture is dried for a period of from 10 minutes or more to 240 minutes or less at a temperature of from room temperature or greater to 150° C. or less.

In a thirteenth embodiment, the present invention provides a method as in the first through twelfth embodiments, wherein the functional gas atmosphere are selected from the group consisting of carbon monoxide, nitric oxide, ammonia, acetylene and mixtures thereof.

In a fourteenth embodiment, the present invention provides a method as in the first through thirteenth embodiments, wherein the functional gas atmosphere further includes a gas selected from hydrogen, inert gas and mixtures thereof.

In a fifteenth embodiment, the present invention provides a method as in the first through fourteenth embodiments, wherein the reduction of the impregnated metal precursors is conducted by heating the precursors on the support material to a temperature of greater than 50° C. and less than 300° C. and keeping the precursors on the support material at that temperature for a period of greater than 0 minutes and less than 180 minutes.

In a sixteenth embodiment, the present invention provides a method as in the first through fifteenth embodiments, wherein, after said step of reducing, the method further comprises the step of removing the functional gas atmosphere.

DETAILED DESCRIPTION OF ILLUSTRATIVE EMBODIMENTS

Figure 1:
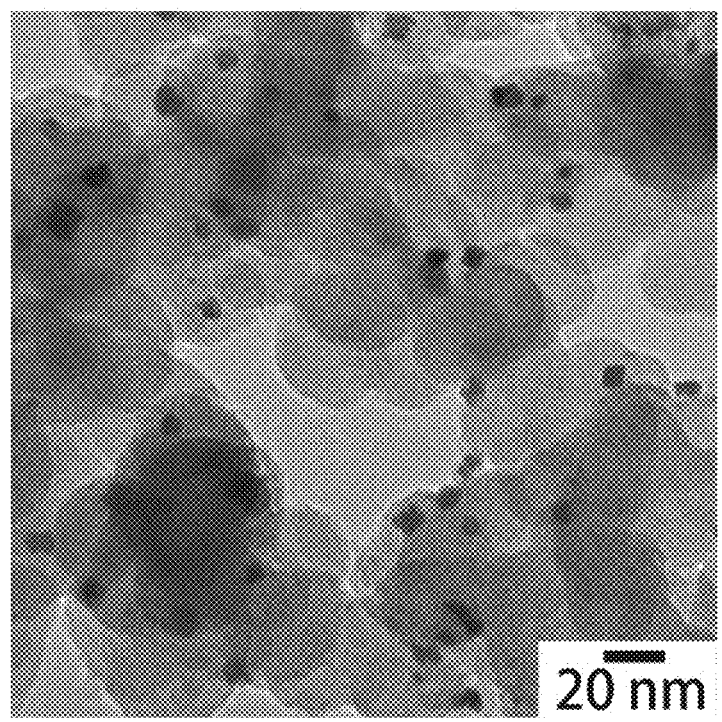
FIG. 1 shows a TEM image of Pt particles that are formed when only pure CO gas is used as the functional gas atmosphere.

The present invention provides for a functional gas-assisted impregnation method to produce catalysts in the form of shaped metal nanoparticles or alloy nanoparticles or both on a support material. The method eliminates the contamination problem of catalysts produced by conventional synthetic methods because it avoids the use of organic capping agents while also simplifying the synthetic procedure. Using this method, metals/metal precursors are impregnated onto support materials, which are treated prior to use. Then, rather than directly reducing the metals/metal precursors into metal and alloy nanoparticles as in conventional impregnation methods, the present method produces shaped nanoparticles by confining the growth rate of different crystal planes. Functional gases, such as but not limited to CO, $NH_3$, NO, and $C_2H_2$, are then used rather than the traditional organic capping agents as in the conventional wet chemistry methods. Functional gases are used because they have preferential adsorption to metal surfaces which are used to control the shape of the growing particles. By being devoid of the use of any organic agents in the synthesis, the present method provides shaped noble metal and alloy nanoparticles free of hydrocarbons and on selected support materials, thereby avoiding possible surface contamination while at the same time providing a facile, low-cost, one-step approach readily scaled up for mass production.

The catalyst is affixed to the support material. Because it is the surface of the catalysts that is reactive, great effort is made to maximize the surface area of a catalyst by distributing it over a support material containing a large specific surface area. In some embodiments, the specific surface area of the support material is from 30 $m^2/g$ or more to 1,500 $m^2/g$ or less. The support materials can have large specific surface areas caused by different reasons, including, but not limited to, having small grains, rough surface, microporous/mesoporous structure, and thin layered structure.

In some embodiments, the support material is selected from carbon, silica, silicon carbide, silicon nitride, carbon nitride, aluminum oxide, titanium oxide, cerium oxide, zirconium oxide, zeolite, aluminum silicate, magnesium aluminate, polymers and mixtures thereof. In some embodiments, the support material is a polymer selected from polyaniline, polyvinylpyrrolindone, polyethylene, polystyrene, and their derivative structures.

The support material is pretreated prior to provide it with desired surface chemistry. The pretreatment can be thermal calcination or surface modification with chemicals. Thermal calcination is a thermal treatment process in presence of air or oxygen which is applied to the support material in order to bring about a thermal decomposition, phase transition or to remove a volatile fraction in the support material. In essence, thermal calcination is used to remove moisture from the surface of the support materials because moisture has been found to negatively influence the particle morphology formation. Thermal calcination usually does not change or provide support surface groups. The main purpose of thermal calcination is for removing the moisture. Many of the support materials have their own surface groups from the very beginning. For instance, a silica support material has silanol groups and a carbon support material would have both hydroxyl and aldehyde groups. Thus this type of pretreatment step of removing moisture serves to purify the support material against the negative effects of moisture on particle morphology formation.

In some embodiments, the support material has its surface modified through chemical processes to generate desired surface chemistry. The surface modification can be thermal treatment of the support materials under reactive atmospheres other than air or oxygen. For instance, a carbon support material can be thermally treated under $NH_3$ atmosphere to generate amine groups on the surface. The surface modification can be a graft of other molecular groups to the support materials surface. For instance, an alumina support materials surface can be modified by reacting with small amount of polydimethylsiloxane, which is then grafted to the alumina surface and provides siloxane surface groups. The main purpose of support surface modification is to alter the interaction between reducing metal precursors and support materials, which can influence the metal precursors reduction and metal particle growth.

In some embodiments, the support surface groups are selected from hydroxyl groups, carboxyl groups, aldehyde groups, silanol groups, and amine groups. The support surface groups can interact with the metal precursors, which influence the movement of the metal precursors to growing sites on the support materials and consequently the size of the produced metal nanoparticles. As noted, many support materials have their own intrinsic surface groups already on the support surface (e.g., silica support material has silanol surface groups; a carbon support material has a mixture of hydroxyl, aldehyde, and carboxylic acid groups; and an alumina support material has a very low content of hydroxyl groups). These types of support materials can be used without surface modification to produce shaped noble metal nanoparticles. However for some other support materials (such as titanium oxide and cerium oxide), the only way to produce tiny nanoparticles is to directly use the support material without any surface modification. However, the surfaces of the support materials interact too strongly with reducing metal precursors, which alter the particle growth. Therefore, when using support materials that lack appropriate surface chemistry, the surfaces of the support materials must be first modified with other groups, such as those identified above, in order to make bigger and shaped nanoparticles on the support.

The present method provides shaped catalysts of noble metals, such as platinum, palladium, rhodium, and ruthenium, iridium, rhenium, tungsten, and their alloys. The alloys include alloys of multiple noble metals and alloys with other transition elements such as but not limited to iron, copper, nickel, cobalt, silver, gold, molybdenum, titanium, vanadium, zinc, cadmium, mercury, gallium, indium, tin, lead, and bismuth. The noble metals and their alloys are produced from metal precursors. In some embodiments, the metal precursors are selected from inorganic precursors and organometallic precursors. In some embodiments, the metal precursors are selected from metal nitrates, metal chlorides, metal sulfates, metal phosphates, metal cyanides, metal carbonyls, metal acetylacetonates, metal stearates, metal acetates, metal propionates, metal fluoroacetylacetonates, and metal fluoroacetates. In some embodiments, the metal precursors are selected from metal nitrates, metal chlorides, metal sulfates, metal phosphates, metal cyanides and mixtures thereof. In some embodiments, the metal precursors are selected from metal carbonyls, metal acetylacetonates, metal stearates, metal acetates, metal propionates, metal fluoroacetylacetonates, metal fluoroacetates and mixtures thereof.

To impregnate the metal precursors onto the support material, which means that the metal precursors are put uniformly on the surface of the support materials, the metal precursors are first dissolved into a solvent to create a metal precursor solution. The solvent is not limited too, but can be selected from the group consisting of water, ethanol, acetone, methanol, propanol, hexane, toluene, chloroform, dimethyl ether, tetrahydrofuran, and/or dimethyl sulfoxide. Suitable solvents will be apparent based on the chosen metal precursors. An appropriate solvent will not react with either the metal precursors or the support materials, and will help to disperse the metal precursors onto the support materials. Then, the metal precursor solution is added to the chosen support material to create a catalyst forming mixture. The catalyst forming mixture is maintained under continuous stirring for a suitable period time to ensure uniform dispersion of the metal precursors on the support materials. Thereafter the catalyst forming mixture is dried to provide a catalyst precursor including the support material and the metal precursor adsorbed thereon.

In some embodiments, the catalyst forming mixture is continuously stirred for a period of greater than 6 minutes and less than 3 hours.

In some embodiments, the catalyst forming mixture is dried for a period of greater than 10 minutes and less than 240 minutes at a temperature of greater than room temperature (23° C.) and less than 150° C.

Noble metal nanoparticles with specific morphology have been found to exhibit improved catalytic properties, such as activity, selectivity and durability. The chosen metal precursors are dissolvable in the chosen solvent, which ensures a uniform dispersion of the metal precursors on the chosen support material, and the chosen metal precursors can be readily reduced into metals and alloys by exposure to an appropriately chosen functional gas.

Once the metal precursor has been effectively impregnated onto the support material, the impregnated metal precursor must be reduced into shaped nanoparticles to be used as a catalyst. To do this, the catalyst precursor is transferred to a reduction furnace and functional gases or functional gases in combination with reducing gases are used to reduce the metals and to confine the formation of the shaped nanoparticles. The preparation of different noble metal and alloy nanoparticles with different morphology, composition, and size can require the optimization of many different synthetic parameters, including the type of functional gas atmosphere, the total pressure/partial pressure of the gases, the ramping rate (the rate used to heat the catalyst precursor from room temperature to the designated reduction temperature) for heating the materials, the reduction temperature, and the reduction time with these parameters being controlled either by adjusting one or more of the gas type or pressure using flow meters and/or valves or adjusting one or more of the reduction temperature or time or ramping rate using the reduction furnace.

The metal precursors are first dissolved in solvent and impregnated onto support materials, resulting in a uniform distribution of metal precursor molecules on the surface of the support materials. The resultant solid is reduced in the functional gas(es) or their mixture with $H_2$ by heating the sample at the designated ramping rate to a designated value and maintaining the designated temperature for the designated reaction time. During this process, the functional gases facilitate the transportation of metal precursors to their growing sites and the reduction of the metal precursors into their respective metal or alloys as the case may be based on the precursors employed. The functional gases preferentially adsorb to certain surfaces of growing metal and alloy nanoparticles, altering the surface plane growth rate and confining their growth into particular morphologies. For instance, if the functional gases adsorb preferentially to the (100) planes, then the grown particles have a cubic morphology. If the functional gases adsorb preferentially to the (111) planes, the grown particles have either a tetrahedral or an octahedral morphology. The many different synthetic parameters, including the type of functional gas atmosphere, the total pressure/partial pressure of the gases, the ramping rate for heating the materials, the reduction temperature, and the reduction time can influence the reduction rate of the metal precursors and the nucleation rate of the reduced metals. These influences consequently affect the growth rate of metal alloy nanoparticles and thus their final particle size.

Functional gas atmospheres, such as CO, $NH_3$, NO, and $C_2H_2$, are used because they have preferential adsorption to metal planes which can be used to control the shape of the metal precursors. The functional gas atmosphere can be a pure gas, such as one listed above, or it can also be a mixture of one of those gases with hydrogen and/or inert gases such as nitrogen and argon, or a mixture of these gases. If multiple gases are used, partial pressures of each gas can be adjusted individually, or the total pressure of all the gases can be adjusted. The whole process will be carried out using only functional gas atmospheres which can be easily removed from the produced materials once the process is complete.

Figure 2:
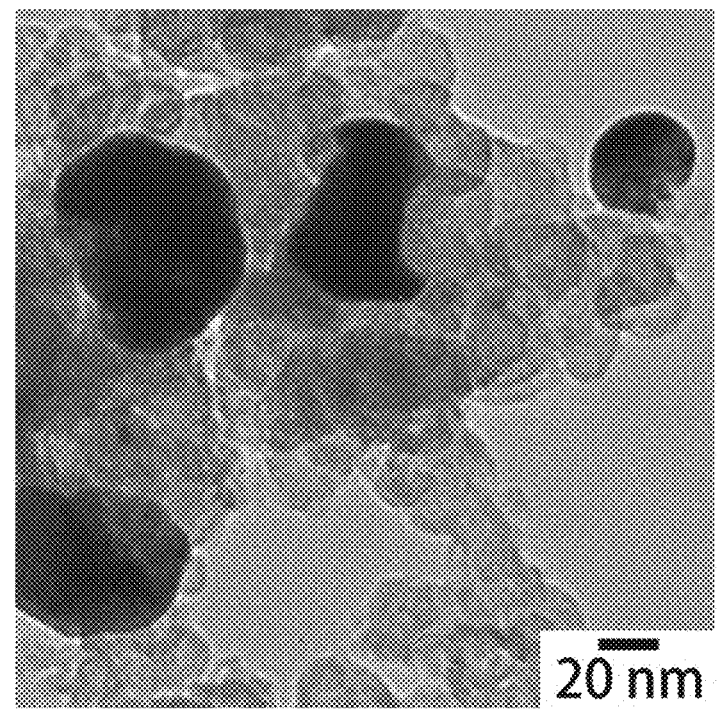
FIG. 2 shows a TEM image of Pt particles that are formed when only pure $H_2$ gas is used as the functional gas atmosphere.

In one embodiment, both CO and $H_2$ gases are used. It has been discovered that both CO and $H_2$ play important roles in determining the final morphology of the shaped metal and alloy nanoparticles. For example, it is known that both gases can reduce the noble metal Pt at 200° C., however when used, the final products are significantly different. For example when only pure CO is used, the Pt particles that are formed contain a mixture of polyhedral, irregular, and cubic shapes as shown in FIG. 1 However, when pure $H_2$ is used, spherical and irregular Pt particles are produced, with many big particles (larger than 20 nm) and some small particles (smaller than 10 nm) coexisting together, as shown in FIG. 2. It is suggested here that $H_2$ facilitates transportation and reduction of the Pt precursors on the carbon support, whereas CO confines growth of Pt nuclei into cubes due to its preferential chemisorption to Pt surfaces. The transportation of Pt precursors is somewhat limited in pure CO, which thus results in the formation of small particles due to localized Pt nucleation and growth. Most of the Pt cannot grow into cubic shapes since not enough precursors are transported to the growing sites. On the other side, free movement of the precursors in pure $H_2$ leads to their efficient transportation to the growing Pt and therefore large Pt particles are formed. Therefore when both CO and $H_2$ gases are used together, Pt nanocrystals are formed in a cubic shape with sharp corners and straight edges.

In light of the foregoing, it should be appreciated that the present invention significantly advances the art by providing a noble metal and alloy catalysts with shaped morphology, and methods for making them that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

Examples

The carbon-supported cubic Pt nanocrystals (PtNCs/C) were prepared by an incipient wetness impregnation method. Prior to use, the amorphous carbon support was firstly thermally-treated in air at 300° C. overnight for removal of moisture. Then, in a typical procedure for making 10 wt % PtNCs/C, platinum acetylacetonate (Pt $(acac)_2$) (0.04 g or 0.10 mmol) dissolved into acetone (4 ml) was added drop wise onto a amorphous carbon support (0.2 g) under vigorous stirring. The mixture was then kept in a dry atmosphere for 2 hours before being transferred to a tube furnace. The sample was reduced in $CO/H_2$ (120/5 cm$^3$/min) by raising the temperature at 5° C./min to 200° C. and maintain at 200° C. for 1 hour.

Figure 3:
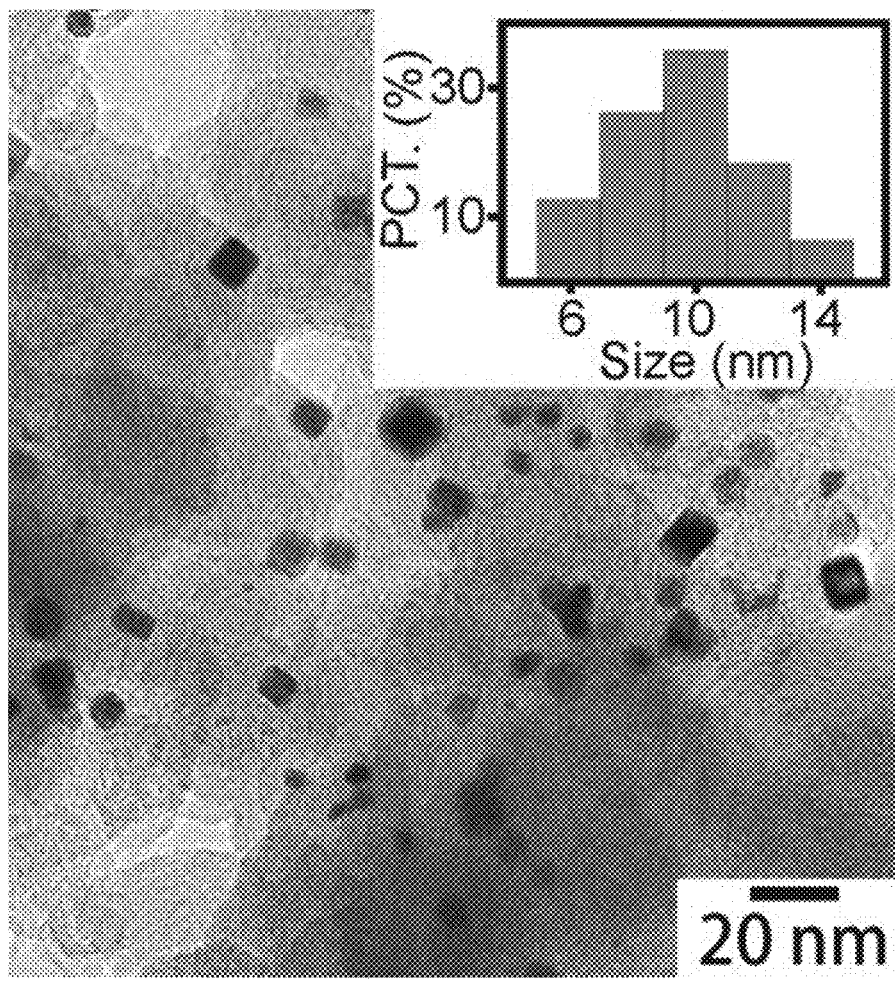
FIG. 3 shows a TEM image of as-made cubic Pt nanocrystals on a carbon support when a mixture of CO and $H_2$ gases are used, and includes a bar graph of the size distribution of the as-made Pt nanocrystals on a carbon support.
Figure 4:
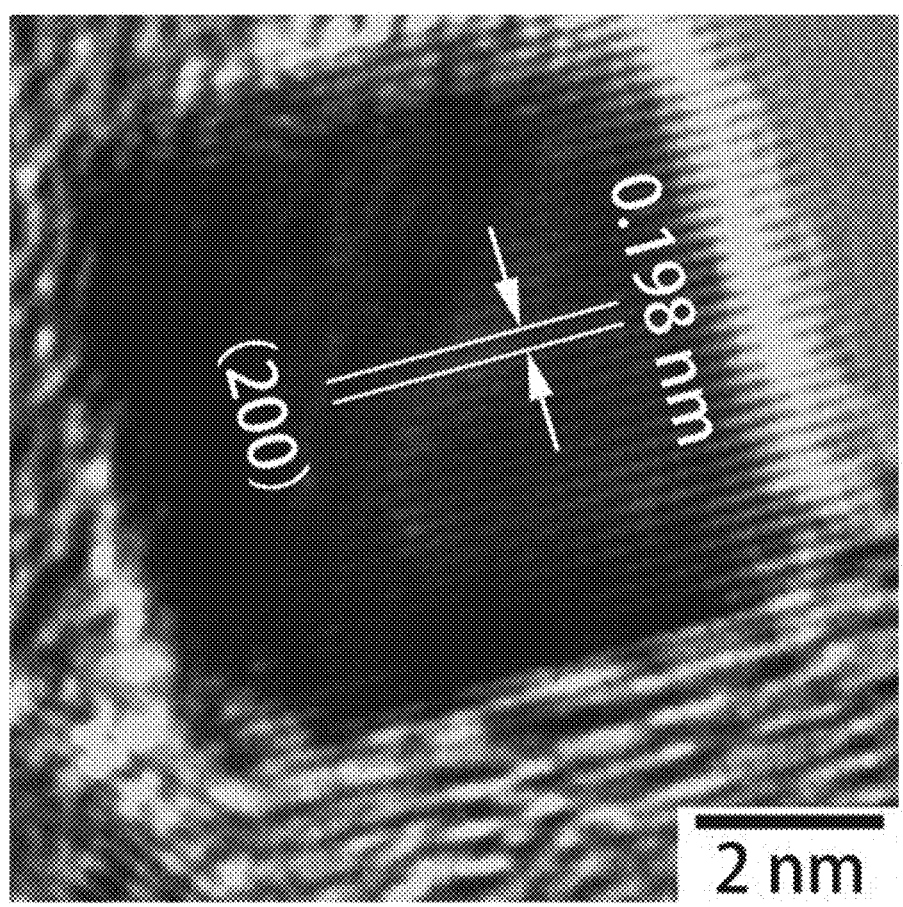
FIG. 4 shows a HRTEM image of one single as-made cubic Pt nanocrystal on a carbon support.

FIGS. 3 and 4 show transmission electron microscopy (TEM) image and the size distribution of the as-made Pt nanocrystals on the carbon support. It can be observed that most of the obtained Pt nanocrystals are in a cubic shape with sharp corners and straight edges, suggesting an effective method for controlling the morphology of the Pt nanocrystals. Statistical analysis of the product gives a narrow size distribution of the Pt nanocrystals, with an average edge size of 9.6 nm and a standard deviation of 2.0 nm. The high-resolution TEM (HRTEM) image of one single PT nanocube shown in FIG. 4 show clear lattice fringes, with a measured inter-planar distance of 1.98 Å. The value is in close match with the lattice spacing of (200) planes of face centered cubic Pt, which indicates that the lattice fringes belong to Pt (200) planes. The lattice fringes are parallel to the cubic particle edges, which suggest that the Pt surfaces are made of the Pt (200) planes.

Figure 5:
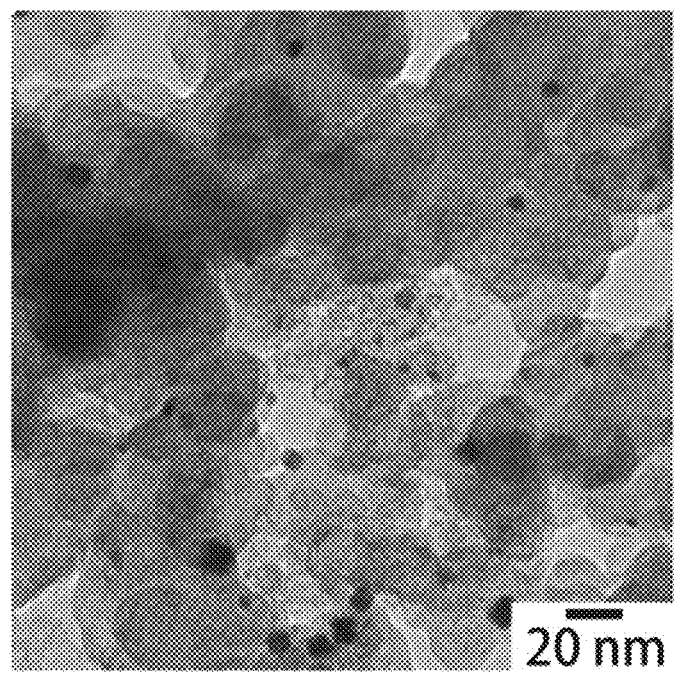
FIG. 5 shows a TEM image of the size distribution of the as-made Pt nanocrystals being observed after 1 minute of reaction at 200° C.
Figure 6:
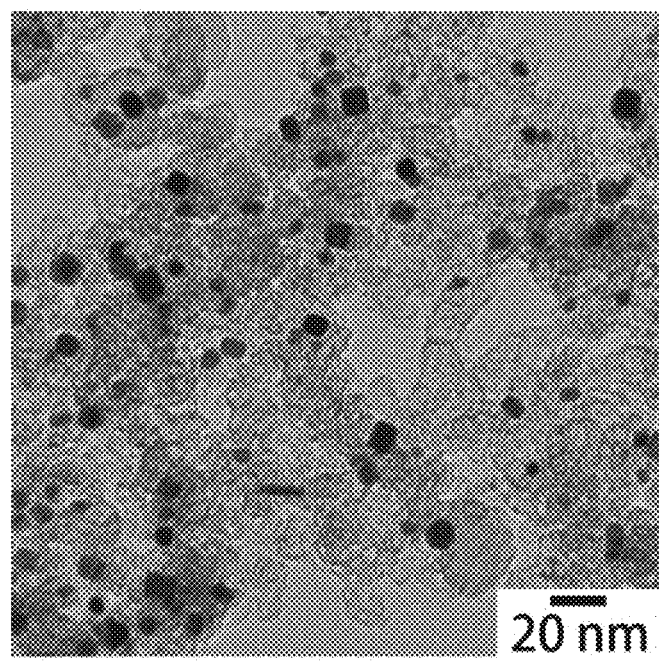
FIG. 6 shows a TEM image of the size distribution of the as-made Pt nanocrystals being observed after 10 minutes of reaction at 200° C.
Figure 7:
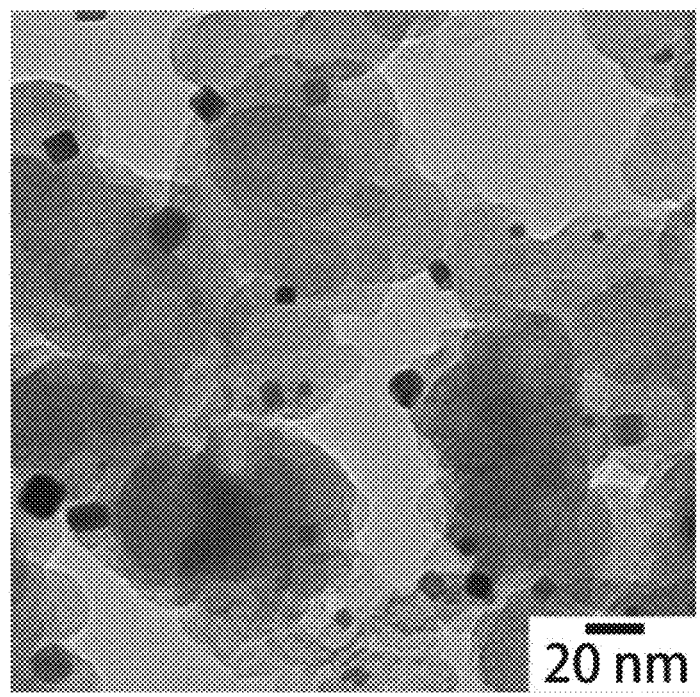
FIG. 7 shows a TEM image of the size distribution of the as-made Pt nanocrystals being observed after 30 minutes of reaction at 200° C.
Figure 8:
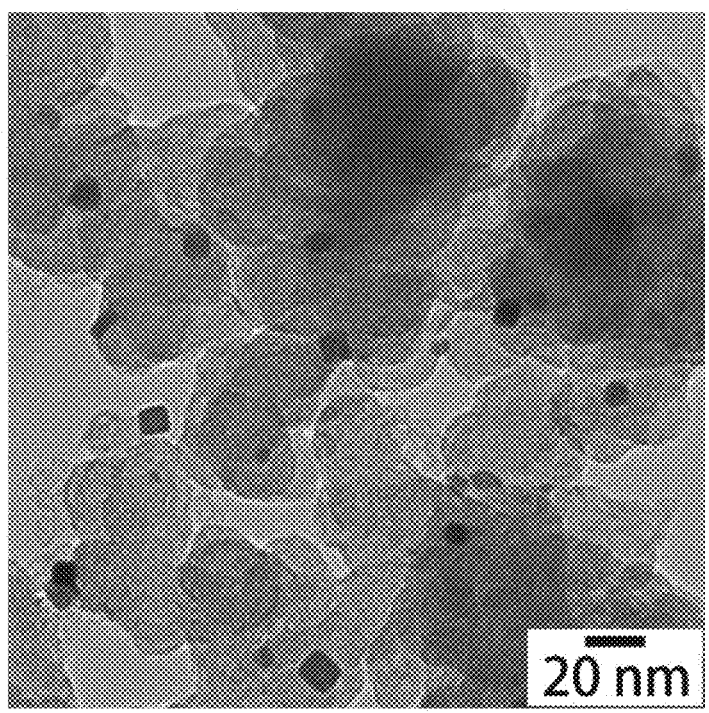
FIG. 8 shows a TEM image of the size distribution of the as-made Pt nanocrystals being observed after 180 minutes of reaction at 200° C.

FIGS. 5, 6, 7 and 8 show TEM of the as-made Pt nanocrystals being collected at different stages of their growth. Many tiny nanoparticles of around 1-3 nm can be observed after 1 minute of reaction at 200° C., indicating that the particles are still in an early growth stage, as shown in FIG. 5. Some bigger as-made Pt nanocrystals in later growth stages, around 5-10 nm by edges, are also present besides the tiny ones. The broad size range indicates different growth rates of the Pt particles, which could be associated with inhomogeneity of the carbon support surface. The tiny Pt particles seem to grow rapidly, with most of them having grown into bigger cubes after 10 minutes of reaction, as shown in FIG. 6. The growth of the as-made Pt nanocrystals continues till consumption of all the Pt precursors occurs. The obtained as-made Pt nanocrystals after 30 minutes of reaction, as shown in FIG. 7, were already of similar size with the as-made Pt nanocrystals obtained after 1 hour of reaction, suggesting completion of Pt reduction after 30 minutes. No further observable changes in both size and morphology of the as-made Pt nanocrystals are found for the sample collected after being reduced for 180 minutes, as shown in FIG. 8. The finding indicates the as-made Pt nanocrystals are thermodynamically stable under these specific reaction conditions.

What is claimed is:

1. A method for making catalysts of noble metal nanoparticles or alloy nanoparticles or both having shaped morphology, the method comprising the steps of:
    pretreating a support material;
    impregnating metal precursors onto said support material; and
    reducing the impregnated metal precursors into shaped metal nanoparticles or shaped alloy nanoparticles or both using a functional gas atmosphere wherein, after reduction, the functional gas atmosphere absorbs to either the (100) planes of the impregnated metal precursors to give the shaped metal nanoparticle or shaped alloy nanoparticles a cubic morphology or to the (111) planes of the impregnated metal precursors to give the shaped metal nanoparticle or shaped alloy nanoparticles either a tetrahedral or an octahedral morphology.

2. The method of claim 1 wherein the support material is selected from the group consisting of carbon, silica, silicon carbide, silicon nitride, carbon nitride, aluminum oxide, titanium oxide, cerium oxide, zirconium oxide, zeolite, aluminum silicate, magnesium aluminate, and polymers.

3. The method of claim 1 wherein the step of pretreating the support material comprises removing moisture from the support material.

4. The method of claim 1 wherein the step of pretreating the support material comprises modifying the support material with surface groups.

5. The method of claim 1 wherein the metal precursors are selected from the group consisting of inorganic salts or organic species.

6. The method of claim 5 wherein the metal precursors are selected from the group consisting of metal chlorides, metal sulfates, metal nitrates, metal cyanides, metal phosphates, metal acetylacetonates, metal stearates, metal acetates, metal carbonyls, metal propionates, metal fluoroacetylacetonates, metal fluoroacetates and mixtures thereof.

7. The method of claim 1 wherein the metal precursors are chosen such that the shaped metal nanoparticles or shaped alloy nanoparticles or both formed in said step of reducing are selected from platinum, palladium, rhodium, ruthenium, iridium, rhenium, tungsten, alloys of two or more of the forgoing, and alloys of one or more of the forgoing with one or more transition metals.

8. The method of claim 7 wherein the transition metals are selected from iron, copper, nickel, cobalt, silver, gold, molybdenum, titanium, vanadium, zinc, cadmium, mercury, gallium, indium, tin, lead, and bismuth.

9. The method of claim 1 wherein impregnating metal precursors onto said support material comprises:
    dissolving the metal precursors in a solvent to make a metal precursor solution;
    mixing said metal precursor solution with said support material to make a catalyst forming mixture; and
    drying said catalyst forming mixture.

10. The method of claim 9 wherein the solvent is selected from the group consisting of water, ethanol, acetone, hexane, chloroform, toluene, methanol, propanol, dimethyl ether, tetrahydrofuran, and dimethyl sulfoxide.

11. The method of claim 9 wherein the metal precursor solution is mixed for a period of from 5 minutes or more to 180 minutes or less.

12. The method of claim 9 wherein the catalyst forming mixture is dried for a period of from 10 minutes or more to 240 minutes or less at a temperature of from room temperature or greater to 150° C. or less.

13. The method of claim 1 wherein the functional gas atmosphere are selected from the group consisting of carbon monoxide, nitric oxide, ammonia, acetylene and mixtures thereof.

14. The method of claim 13 wherein the functional gas atmosphere further includes a gas selected from hydrogen, inert gas and mixtures thereof.

15. The method of claim 13 wherein the functional gas atmosphere includes a mixture of carbon monoxide and hydrogen.

16. The method of claim 15 wherein the majority of the functional gas atmosphere is carbon monoxide and the minority of the functional gas atmosphere is hydrogen.

17. The method of claim 1 wherein the reduction of the impregnated metal precursors is conducted by heating the precursors on the support material to a temperature of greater than 50° C. and less than 300° C. and keeping the precursors on the support material at that temperature for a period of greater than 0 minutes and less than 180 minutes.

18. The method of claim 1 wherein, after said step of reducing, the method further comprises the step of removing the functional gas atmosphere.

* * * * *